United States Patent
Quiroz-Hernandez et al.

(10) Patent No.: US 10,490,090 B2
(45) Date of Patent: Nov. 26, 2019

(54) METHOD AND DEVICE FOR ADJUSTING PERFORMANCE VARIABLES OF AN AIRCRAFT

(71) Applicant: Airbus Operations (S.A.S.), Toulouse (FR)

(72) Inventors: Esteban Quiroz-Hernandez, Toulouse (FR); Christophe Bouchet, Toulouse (FR); Jean-Pierre Demortier, Maurens (FR); Sylvain Raynaud, Cornebarrieu (FR); François Cusset, Brax (FR); Marc Vie, Labarthe sur Leze (FR); Alexandre Grattard, Colomiers (FR)

(73) Assignee: Airbus Operations (S.A.S.), Toulouse (FR)

( * ) Notice: Subject to any disclaimer, the term of this patent is extended or adjusted under 35 U.S.C. 154(b) by 19 days.

(21) Appl. No.: 15/840,522

(22) Filed: Dec. 13, 2017

(65) Prior Publication Data

US 2018/0174473 A1 Jun. 21, 2018

(30) Foreign Application Priority Data

Dec. 19, 2016 (FR) ...................................... 16 62772

(51) Int. Cl.
*G08G 5/02* (2006.01)
*G01C 21/20* (2006.01)
(Continued)

(52) U.S. Cl.
CPC ............. *G08G 5/025* (2013.01); *G01C 21/20* (2013.01); *G01C 23/00* (2013.01); *G05B 17/02* (2013.01);
(Continued)

(58) Field of Classification Search
CPC ........ G01C 21/20; G01C 23/00; G05B 17/02; G05B 19/0423; G05B 19/056;
(Continued)

(56) References Cited

U.S. PATENT DOCUMENTS 5,666,282 A 9/1997 Itami et al.
6,134,500 A * 10/2000 Tang .................... G06Q 10/047
701/10

(Continued)

FOREIGN PATENT DOCUMENTS

DE 4410928 A1 10/1994
FR 3020477 A1 10/2015

OTHER PUBLICATIONS

French Search Report for French Application No. 1662772 dated Aug. 24, 2017.

*Primary Examiner* — Tyler J Lee
(74) *Attorney, Agent, or Firm* — Jenkins, Wilson, Taylor & Hunt, P.A.

(57) ABSTRACT

A method and device for adjusting performance variables of an aircraft. The device which is intended for adjusting performance variables, the performance variables being generated by at least one performance module, includes an auxiliary data input unit for entering into a flight management system correction data intended to be used for adjusting at least one associated performance variable, and a correction unit for carrying out a correction, the correction including adjusting the associated performance variable on the basis of the input correction data.

20 Claims, 3 Drawing Sheets

(51) Int. Cl.
  G05D 19/00    (2006.01)
  G01C 23/00    (2006.01)
  G08G 5/00     (2006.01)
  G05B 17/02    (2006.01)
  G05B 19/05    (2006.01)
  G05D 1/06     (2006.01)
  G05B 19/042      (2006.01)

(52) U.S. Cl.
  CPC ......... *G05B 19/056* (2013.01); *G05D 1/0653* (2013.01); *G05B 19/0423* (2013.01); *G05B 2219/1187* (2013.01); *G08G 5/0021* (2013.01)

(58) Field of Classification Search
  CPC ......... G05B 2219/1187; G05D 1/0653; G08G 5/0021; G08G 5/025
  See application file for complete search history.

(56) References Cited

U.S. PATENT DOCUMENTS

| | | | |
|---|---|---|---|
| 7,739,004 B2* | 6/2010 | Johnson | F02C 9/46 |
| | | | 701/1 |
| 9,927,243 B2* | 3/2018 | Demortier | G01C 21/20 |
| 10,071,818 B2* | 9/2018 | Kim, II | G06F 16/23 |
| 2008/0300738 A1* | 12/2008 | Coulmeau | G01C 21/20 |
| | | | 701/3 |
| 2010/0076672 A1* | 3/2010 | Cremers | G06Q 10/04 |
| | | | 701/123 |
| 2011/0208374 A1* | 8/2011 | Jayathirtha | G05D 1/0676 |
| | | | 701/5 |
| 2015/0308834 A1 | 10/2015 | Demortier et al. | |
| 2017/0197727 A1* | 7/2017 | Kim, II | G06F 16/23 |

* cited by examiner

METHOD AND DEVICE FOR ADJUSTING PERFORMANCE VARIABLES OF AN AIRCRAFT

CROSS-REFERENCE TO RELATED APPLICATION

This patent application claims priority to French patent application FR 16 62772, filed on Dec. 19, 2016, the entire disclosure of which is incorporated by reference herein.

TECHNICAL FIELD

The present disclosure relates to a method and a device for adjusting performance variables of an aircraft provided with a flight management system.

In general, a flight management system of the FMS (standing for "Flight Management System" in English) type of an aircraft, in particular of a transport aircraft, implements, among others, various functions such as navigation, flight planning, lateral and vertical guidance, as well as performance computations.

In order to carry out some of these functions, the flight management system comprises a performance module implementing at least one performance model of the aircraft.

BACKGROUND

Usually, the performance module comprises a performance computation unit, at least one performance database and at least one data input unit. Variables resulting from performance computations are generated by the computation unit based on data coming from the performance database and of data entered using the data input unit.

The computation unit carries out performance computations which are required in order to accomplish various functions, for example in order to determine fuel consumption and/or flight time along a flight plan predictions.

The performance database which is installed in the flight management system comprises one or more performance files. Each performance file contains a set of data relative to the engine, the aerodynamics or to other data related to performance, such as the characteristic speeds of the aircraft, and this being for a given type of aircraft.

In the context of the present disclosure, type of aircraft is understood to be a particular combination of a given type of aerodynamic structure and a given type of engine.

In general, the performance database is produced under the responsibility of the original manufacturer of the aircraft. This performance database is installed within the FMS system and, as a component of the FMS system, must meet qualification standards imposed by the air authorities.

The processes associated with the performance variables therefore generate data representative of a type of aircraft, and not of an individual aircraft. Now, it so happens that each aircraft individually has specific characteristics, for example because of the ageing of the components constituting that aircraft and of the renewal of a portion of those components throughout the service life of that aircraft.

The performance file or files which are therefore representative of a given type of aircraft do not make it possible to represent accurately the specific characteristics of the individual performances of the aircraft (of that given type) in question.

One solution compatible with this prior art could be to produce performance databases with a plurality of performance files for individual aircraft and to make provision for frequent updates of the databases in order to take account of the ageing of the aircraft, its maintenance, etc. However, such a solution would not be satisfactory or even feasible for various reasons, and notably:

the process for generating new performance databases is generally long and costly;

the configuration management required for distributing that many performance databases would be too inconvenient for the manufacturers or the airline companies; and the adjustment of the performance database for an individual aircraft necessitates a very large number of flight data recordings for that particular aircraft, which are not available from the manufacturer of the aircraft before delivery of the aircraft to the customer.

Consequently, it cannot be envisioned to provide such a solution consisting of or comprising generating new performance database files in order to adapt the data to the effective individual state of an aircraft.

The usual situation is not therefore completely satisfactory, because the performance model is not optimized for a given specific aircraft (of that type of aircraft).

SUMMARY

A purpose of the present disclosure is to overcome this disadvantage, by providing a solution for adjusting the data contained in a performance database without having to generate a new performance database file.

In order to do this, the present disclosure relates to a method for adjusting performance variables of an aircraft, the performance variables being generated by at least one performance module integrated in a flight management system of the aircraft, the performance module comprising a performance computation unit, at least one performance database and at least one data input unit, the performance data being generated by the computation unit on the basis of (based on) data coming from the performance database and of data entered using the data input unit.

According to the disclosure herein, the method for adjusting performance variables comprises:

a correction data input step, implemented by at least one auxiliary data input unit, consisting of or comprising entering correction data into a computer, the correction data being intended to be used for adjusting at least one so-called associated performance variable;

a checking step, implemented by a checking unit, consisting of or comprising checking, during the input of correction data, if the entered correction data are in conformity with a set of authorizations and prohibitions, the authorizations and prohibitions being predetermined and recorded in the computer, the checking step also consisting of or comprising issuing a correction authorization or a correction rejection as a function of the result of the check; and a correction step, implemented by a correction unit of the flight management system, consisting of or comprising carrying out a correction solely in the case of the issue of a correction authorization during the checking step, the correction consisting of or comprising adjusting the associated performance variable on the basis of the correction data.

Thus, from the disclosure herein, it is possible to adjust (by a correction) the performance variables computed on the basis of a performance database (which is destined for a type of aircraft) in order to adapt (or adjust) them to characteristics peculiar to the aircraft in question, via correction data representative of the current effective characteristics and capabilities of the aircraft in question. This adaptation is carried out without having to generate a new performance database file, which makes it possible to overcome the aforethe disadvantage.

Moreover, from the checking step the adaptation can be limited to that which has been previously authorized by the original manufacturer of the aircraft, as described below.

According to a first alternative, the computer into which the correction data are entered and in which are recorded the authorizations and prohibitions, corresponds to the flight management system. According to a second alternative, this computer is a computer external to the flight management system, in particular a computer situated on the ground, for example in an operational centre of the airline company operating the aircraft.

Advantageously, the set of authorizations and prohibitions comprises at least one of the following elements:
at least one list of performance variables, for which a correction is authorized;
parameters as a function of which the correction data are defined;
acceptable limit values for the values of the correction data;
at least one list of performance variables, for which a correction is not authorized.

Moreover, advantageously, the correction data comprise at least one of the following elements:
a multiplier (or scale factor) and/or a bias;
a mathematical function.

Preferably, the correction step comprises:
for an item of correction data corresponding to a multiplier and/or to a bias, of applying this multiplier and/or this bias to the associated performance variable; and
for an item of correction data corresponding to a mathematical function, of applying this mathematical function to the associated performance variable.

Moreover, advantageously, the method also comprises an alert step consisting of or comprising generating an indication of rejection of correction data intended for at least one operator, when a correction rejection is issued in the checking step.

The present disclosure also relates to a device for adjusting performance variables of an aircraft, the performance variables being generated by at least one performance module integrated in a flight management system of the aircraft.

According to the disclosure herein, the device for adjusting performance variables comprises:
at least one auxiliary data input unit configured for entering correction data into the flight management system, the correction data being intended to be used for adjusting at least one so-called associated performance variable; and
a correction unit configured for carrying out a correction, the correction consisting of or comprising adjusting the associated performance variable on the basis of the correction data.

In a particular way, the device for adjusting performance variables comprises moreover a checking unit configured for checking, during the input of correction data, if the entered correction data are in conformity with a set of authorizations and prohibitions, the authorizations and prohibitions being predetermined and recorded in a memory, the checking unit also being configured for issuing a correction authorization or a correction rejection as a function of the result of the check and the correction unit is configured for carrying out the correction solely in the case of the issue of a correction authorization by the checking unit.

In a first embodiment, the memory, in which are recorded the authorizations and prohibitions, forms part of a performance database of the performance module, whereas, in a second embodiment, the memory is separate (and independent) from the performance database of the performance module.

Moreover, in a particular embodiment, the auxiliary data input unit comprises:
a data transmission link; and/or
a data loading and configuration system of the DLCS (standing for "Data Loading Configuration System" in English) type; and/or
an onboard electronic device comprising applications, of the EFB (standing for "Electronic Flight Bag" in English) type; and/or
a manual input unit.

The present disclosure also relates to:
a flight management system comprising a performance module, as well as a device for adjusting performance variables, such as described above; and/or
an aircraft, in particular a transport aircraft, which is provided with such a flight management system and/or with such a device for adjusting performance variables.

BRIEF DESCRIPTION OF THE DRAWINGS

The appended figures will give a good understanding of how the disclosure herein may be embodied. In these example figures, identical references denote similar elements. More particularly.

DETAILED DESCRIPTION

Figure 1A:
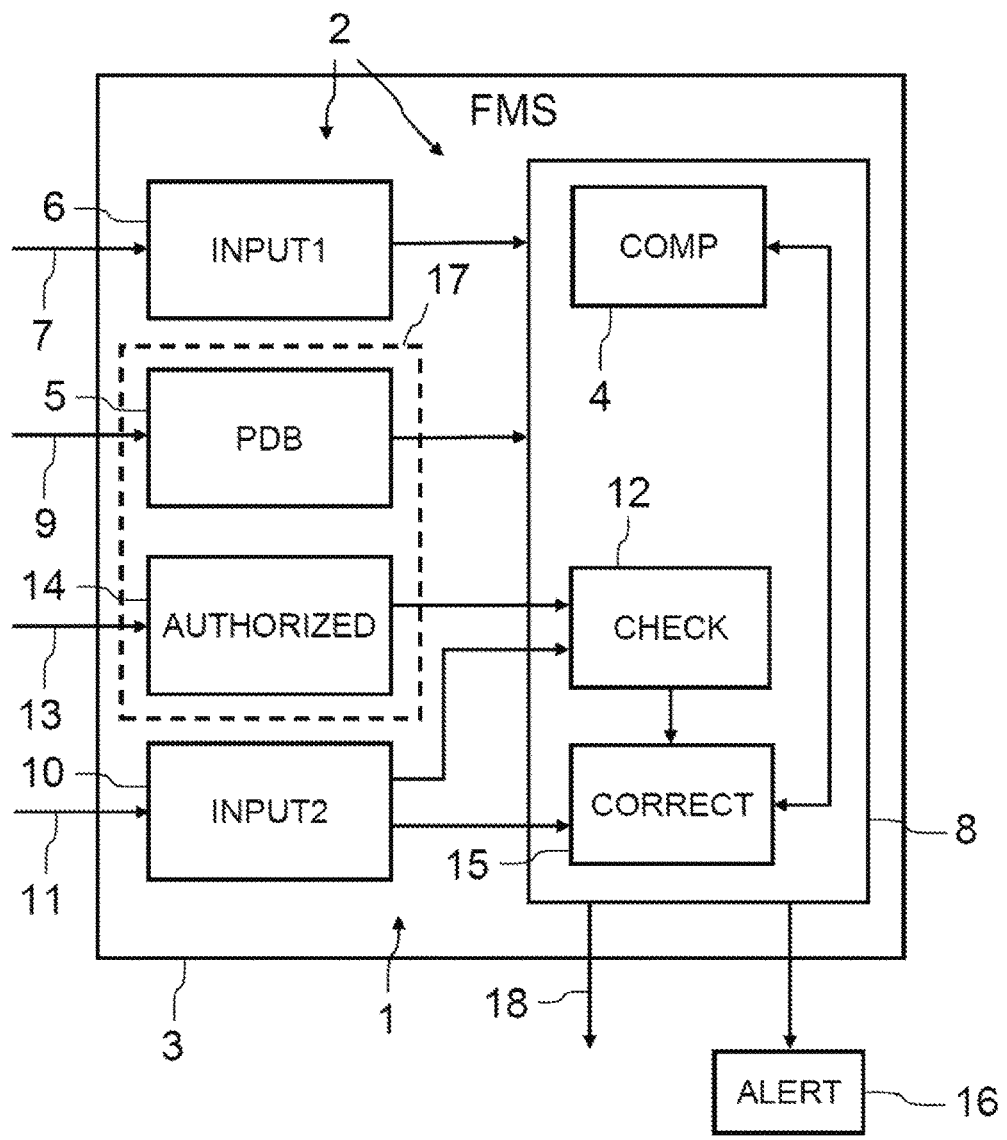
FIG. 1A is a block diagram of a particular embodiment of a flight management system comprising a device for adjusting performance variables.

The device 1 illustrating an embodiment corresponding to a first alternative embodiment of the disclosure herein and shown in block diagram form in FIG. 1A is intended for adjusting performance variables of an aircraft, in particular of a transport aircraft.

The performance variables are generated by at least one performance module 2 integrated in a flight management system 3 of the FMS (standing for "Flight Management System" in English) type, also shown in FIG. 1A, and can be used by the flight management system 3 and/or can be supplied via a link 18 to a user system (not shown).

The device 1 forms part of the flight management system 3.

As shown in FIG. 1A, the performance module 2 which uses at least one performance model, comprises:
a (performance) computation unit 4 COMP (standing for "Performance Computation Unit" in English);
at least one performance database 5 PDB (standing for "Performance Data Base" in English); and
at least one data input unit 6 ("INPUT1") making it possible to enter data, into the flight management system 3, as illustrated by an arrow 7.

The data entered, via the data input unit 6, can be data entered manually by the pilot, data transmitted by a data link of the airline company to which the aircraft belongs and options configurable by the airline company. The data input unit 6 is configured, in the usual way, in order to allow such data inputs.

The computation unit 4 carries out, in the usual way, performance computations which are required for accomplishing various functions, for example in order to provide fuel consumption and/or flight time of the aircraft along a flight plan predictions. In order to do this, the computation unit 4 contains usual algorithms which make it possible to compute from a set of input data a set of variables at the output relating to the performance of the aircraft.

These performance variables resulting from a performance computation are generated by the computation unit 4 on the basis of data coming from the performance database 5 and of data entered by the data input unit 6.

By way of illustration, a performance variable $V_i(\{X\})$ can depend on a vector of parameters $\{X\}$ comprising a plurality n of parameters $x_j$, namely $\{X\}=\{x_1, x_2, \ldots, x_n\}$.

The performance data are loaded into the performance database 5 via a link 9. The performance database 5 comprises one or more performance files. Each performance file contains a set of data relating to the engine or to the aerodynamics or other data relative to performance such as the characteristic speeds of the aircraft, this being for a given type of aircraft, that is to say for a particular combination of a given type of aerodynamic structure and a given type of engines.

The input data can be the weight of the aircraft, thrust adjustments or correction factors which are intended to better adjust the performance model of the aircraft. The following can be mentioned in particular:

a performance factor which is used for adjusting the fuel flow such as represented in the performance model; and an idling factor which is used for adjusting the idling thrust produced by the engine such as represented in the performance model.

A purpose of these factors is to compensate for the differences between the data associated with the type of the aircraft in the performance database and individual characteristics of the aircraft, which can notably exhibit degraded performance due to age. The performance model which comprises a performance file and correction factors such as the aforethe performance and idling factors, is not sufficiently accurate to be able to represent the individual performance of the aircraft in different flight conditions such as the takeoff, the climb, the cruising flight, the descent, the landing, etc.

Also, in order to refine (or adjust) the performance variables, the device 1 comprises, according to the embodiment of the disclosure herein:

at least one auxiliary data input unit 10 ("INPUT2") configured for entering correction data into the flight management system 3, as illustrated by an arrow 11. The input correction data are representative of current effective characteristics and capabilities of the aircraft and are intended to be used for adjusting at least one so-called associated performance variable;

a checking unit 12 CHECK (standing for "Checking Unit" in English) which is configured for checking, during the input of correction data via the auxiliary data input unit 10, if the input correction data are in conformity with a set of authorizations and prohibitions. The authorizations and prohibitions are predetermined and are recorded (or loaded) via a link 13 in a memory 14 AUTHORIZED (standing for "Authorized correction" in English). The checking unit 12 is also configured for issuing a correction authorization or a correction rejection as a function of the result of the check that it carries out; and a correction unit 15 CORRECT (standing for "Correction Unit" in English) which is configured for carrying out a correction, and for doing so solely in the case of the issue of a correction authorization by the checking unit 12. The correction consists of or comprises adjusting the associated performance variable (by correcting it) on the basis of the correction data entered by the auxiliary data input unit 10. The results can be used by the system.

Thus, the device 1 is capable of correcting performance variables computed on the basis of the performance database 5 (which is intended for a type of aircraft) in order to optimize them, by adapting them (or adjusting them) to the characteristics peculiar to the aircraft in question, this being via correction data representative of the current effective characteristics and capabilities of the aircraft in question. This adaptation is carried out without having to generate a new performance database.

The set of authorizations and prohibitions, stored in the memory 14, comprises at least one of the following elements:

at least one list of performance variables, for which a correction is authorized and, additionally, a list of performance variables for which a correction is not authorized. These two lists are mutually exclusive and together cover all of the performance variables computed on the basis of each performance file;

parameters on the basis of which the correction data are defined. It is stated how the corrections are specified (as a function of which parameters). The parameters which can be used for defining the corrections must be compatible with a list of parameters which can be used for defining correction data and interpolation functionalities, for example the Mach number, the weight, the attitude, the centre of gravity. In general, the parameters which are already used for defining the data of the initial performance file can also be used as parameters for the correction data. For example, in the case where a scale factor (or multiplier) $S_i$ is defined for adjusting a performance variable computed on the basis of the performance data $L_i$, the parameters $\{Y\}$ for tabulating $S_i$ are specified, for example $\{Y\}=\{Mach,CG\}$, CG representing the centre of gravity of the aircraft;

acceptable limit values for the limit values that a correction can have. By way of example, in the case of a correction in the form of a scale factor $S_i(\{Y\})$ as described above, a table of maximum authorized values $S_i^{MAX}(\{Y\})$ and a table of minimum authorized values $S_i^{MIN}(\{Y\})$ are defined numerically.

The definition of the performances and the production of the performance database 5 is, in general, the responsibility of the original manufacturer of the aircraft. In the context of the present disclosure, the definition of all of the authorizations and prohibitions is also preferably allocated to the original manufacturer of the aircraft. Thus, the subsequent adjustment of the performance variables can be limited to that which is (previously) authorized by the original manufacturer.

Moreover, the correction data comprise at least one of the following elements:

a scale factor (or multiplier) and/or a bias;

a mathematical function.

In a particular embodiment, the units 4, 12 and 15 form part of a central processing unit 8.

Moreover, the device 1 also comprises an alert unit 16 ALERT (standing for "Alert Unit" in English), for example a display screen, which is configured for generating an indication of correction rejection, of an audible and/or visual type, for at least one operator, when a correction rejection is issued by the checking unit 12.

In a first embodiment, the memory 14, in which the authorizations and prohibitions are recorded, forms part of the same database as the performance database 5, as illustrated by a reference 17 in FIG. 1.

Moreover, in a second embodiment, the memory 14 is separate from the performance database 5.

In the context of the present disclosure, memory is understood to be any element or storage space able to store data.

Moreover, in a particular embodiment, the auxiliary data input unit 10 comprises at least one (and preferably several) of the following elements:

a data transmission link. In this case, data correction tables are transmitted to the flight management system 3, by AOC messages through the (wireless) data transmission link, using for example the ACARS system or other data link(s). The flight management system 3 comprises appropriate functions for receiving and storing the data (including an automatic reception by data link of several successive messages if the correction data does not form part of an individual message);

a data loading and configuration system of the DLCS type. In this case, the data correction tables are transmitted to the flight management system 3 via the data loading and configuration system;

an onboard electronic device comprising applications, of the EFB (standing for "Electronic Flight Bag" in English) type. In this case, the correction data are transmitted to the flight management system 3 by the electronic device; and/or a manual input unit. In this case, the correction data are entered manually into the flight management system 3 by an operator via a dedicated interface comprising that manual input unit.

Figure 2:
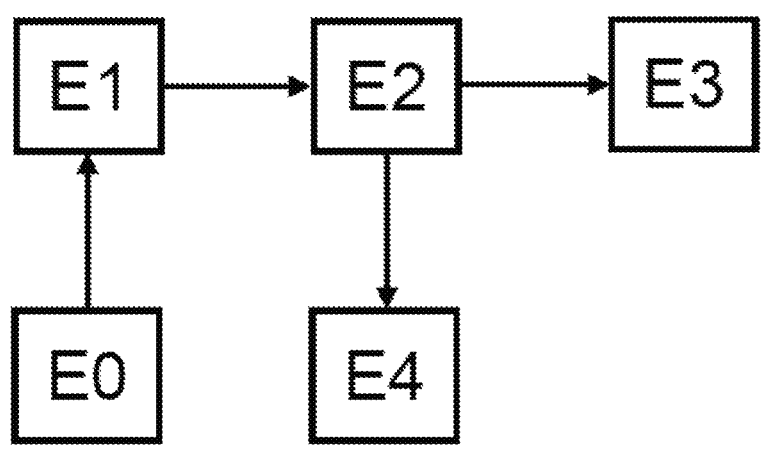
FIG. 2 is the block diagram of a method for adjusting performance variables implemented by the device shown in FIG. 1.

The functioning of the device 1 such as described above is explained below by presenting an adjustment method that it implements. This adjustment method comprises, notably, the following steps E1 to E3, as shown in FIG. 2:

a correction data input step E1, implemented by the auxiliary data input unit 10, consisting of or comprising entering correction data into the flight management system 3, the correction data being representative of current effective characteristics and capabilities of the aircraft and being intended to be used for adjusting at least one so-called associated performance variable;

a checking step E2, implemented by the checking unit 12, consisting of or comprising checking, during the entry of correction data, if the input correction data are in conformity with a set of authorizations and prohibitions, the authorizations and prohibitions being predetermined and recorded in the memory 14 of the flight management system 3, the checking step E2 consisting of or comprising issuing a correction authorization or correction rejection as a function of the result of the check; and a correction step E3, implemented by the correction unit 15, consisting of or comprising carrying out a correction solely in the case of issue of a correction authorization during the checking step E2, the correction consisting of or comprising adjusting (by correcting it) an associated performance variable on the basis of the correction data.

The method also comprises:

a prior step E0 consisting of or comprising determining the authorizations and prohibitions and of recording them in the memory 14 of the flight management system 3; and an alert step E4, implemented by the alert unit 16, consisting of or comprising generating a correction rejection indication, to at least one operator, when a correction rejection is issued in the checking step E2.

The checking step E2 therefore consists of or comprises checking to determine if the input correction data is in conformity with the set of authorizations and prohibitions contained in the memory 14.

By way of illustration, it can be a matter of checking if the parameters on the basis of which the correction data are defined are the same as those of the correction authorizations. In this case, for example for a correction in the form of a scale factor which depends in the correction data on the Mach number and altitude parameters, if the corresponding definition of the authorized correction data depends on the Mach number and the centre of gravity, the correction request is rejected, because the names of the parameters are not all in conformity.

By way of additional illustration, it can also be a matter of checking if all of the tabulated numerical values of the correction data are within the authorized maximum and minimum numerical values. In this case, for example for tabulated values of a scale factor $S_i(\{Y\})$ in the correction data and tabulated values of $S_i^{MAX}(\{Y\})$ and of $S_i^{MIN}(\{Y\})$ within the authorized correction limits, the correction is authorized if for all of the tabulated elements of $S_i(\{Y\})$ the following rule is verified: $S_i^{MIN}(\{Y\}) \leq S_i(\{Y\}) \leq S_i^{MAX}(\{Y\})$. If not, the correction data is rejected.

In a first embodiment, the correction implemented by the correction unit 15, in the correction step E3, consists of or comprises, for an item of correction data corresponding to a scale factor and/or to a bias, applying this scale factor and/or this bias to the associated performance variable in order to obtain a corrected (or adjusted) performance variable.

By way of example, the correction data correspond to a scale factor $S_i(\{Y\})$ and to a bias $B_i(\{Z\})$, obtained by interpolation on the basis of a set of correction data $S_i$ and $B_i$ respectively using vectors of parameters $\{Y\}$ and $\{Z\}$. The correction data $S_i$ and $B_i$ are associated with a performance variable $V_i(\{Y\})$ computed from the data $L_i$ using the vector of parameters $\{X\}$. The computation formula used for obtaining the corrected performance variable $V_i$corr (destined to replace the variable $V_i$ coming from the performance module 2) is in this case:

$$V_i\mathrm{corr}(\{X\},\{Y\},\{Z\})=S_i(\{Y\})*V_i(\{X\})+B_i(\{Z\}).$$

Moreover, in a second embodiment, the correction implemented by the correction unit 15, in the correction step E3, consists of or comprises, for an item of correction data corresponding to a mathematical function, applying that mathematical function to the performance variable in order to obtain a corrected variable intended to replace it.

More precisely, the correction data can correspond to quantities defining a polynomial function, an exponential function, a logarithmic function, a neural network or another mathematical function.

For example, in the context of a quadratic polynomial function, the correction data correspond to the coefficients of that function: $A_i(\{Y\})$, $C_i(\{Z\})$, $D_i(\{U\})$. In this case, the correction unit 15 computes the corrected correction variable $V_i$corr, according to this type of function or functions. For the example of the quadratic polynomial function, the following is obtained for the corrected variable $V_i$corr (intended to replace the variable $V_i$):

$$V_i\mathrm{corr}(\{X\},\{Y\},\{Z\},\{U\})=A_i(\{Y\})*V_i(\{X\})^2+C_i(\{Z\})*V_i(\{X\})+D_i(\{U\}).$$

Figure 1B:
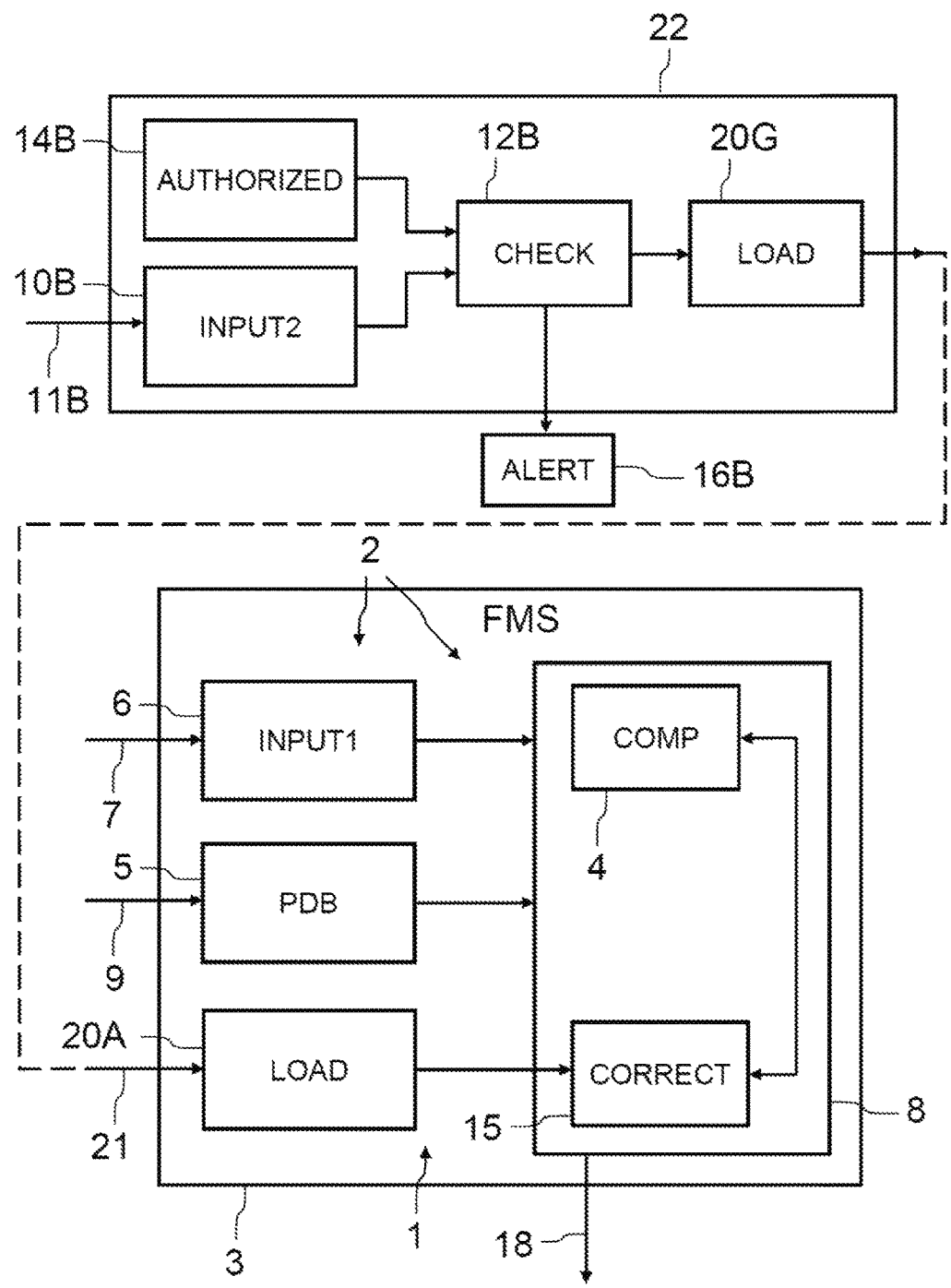
FIG. 1B is a block diagram of a variant of the embodiment shown in FIG. 1A.

In an embodiment corresponding to a second alternative embodiment of the disclosure herein and shown in FIG. 1B, the performance module 2, integrated in the flight management system 3 of the FMS type and which implements at least one performance model, comprises:

a (performance) computation unit 4 COMP (standing for "Performance Computation Unit" in English);

at least one performance database 5 PDB (standing for "Performance Data Base" in English); and at least one data input unit 6 ("INPUT1") making it possible to enter data, into the flight management system 3, as illustrated by an arrow 7.

In order to refine (or adjust) the performance variables, the device 1 comprises:

at least one auxiliary data input unit 20A ("LOAD") configured for entering correction data into the flight management system 3, as illustrated by an arrow 21. The input correction data are representative of current effective characteristics and capabilities of the aircraft and are intended to be used for adjusting at least one so-called associated performance variable; and a correction unit 15 CORRECT (standing for "Correction Unit" in English) which is configured for carrying out a correction. The correction consists of or comprises adjusting the associated performance variable (by correcting it) on the basis of the correction data entered via the auxiliary data input unit 20A. The results can be used by the system.

The correction data are prepared and checked outside of the system 1, in particular on the ground, for example in an operational centre of the airline company operating the aircraft, by a computer 22. As shown in FIG. 1B, this computer 22 comprises:

- at least one data input unit 10B ("INPUT2") configured for entering correction data into the computer 22, as illustrated by an arrow 11B. The input correction data are representative of current effective characteristics and capabilities of the aircraft and are intended to be used for adjusting at least one so-called associated performance variable;
- a checking unit 12B CHECK (standing for "Checking Unit" in English) which is configured for checking, during the input of correction data via the auxiliary data input unit 10B, if the input correction data are in conformity with a set of authorizations and prohibitions. The authorizations and prohibitions are predetermined and are recorded (or loaded) in a memory 14B AUTHORIZED (standing for "Authorized correction" in English). The checking unit 12B is also configured for issuing a correction authorization or a correction rejection as a function of the result of the check that it carries out; and
- a load generation unit 20G ("LOAD") configured for producing at least one load file when a correction authorization is issued by the checking unit 12B. This load file is intended to be loaded into the flight management system 3 of the aircraft. The load file contains the correction data entered into the computer 22 by the data input unit 10B (possibly converted into a binary format), as well as an electronic signature making it possible to check the integrity and the authenticity of the file.

Moreover, the computer 22 also comprises an alert unit 16B ALERT (standing for "Alert Unit" in English), for example a display screen, which is configured for generating an indication of correction rejection, of audible and/or visual type, for at least one operator, when a correction rejection is issued by the checking unit 12B.

The input of the correction data into the flight management system 3, by the auxiliary data input unit 20A, such as illustrated by the arrow 21 corresponds to the loading into the flight management system 3 of a load file produced by the computer 22 as described above. According to one embodiment, this load file can be loaded into the flight management system 3 by a data link (represented in FIG. 1B by a dashed line between the computer 22 and the flight management system). According to another embodiment, the load file can be loaded into the flight management system 3 by a data loading and configuration system of the DLCS type. According to yet another embodiment, the load file can be loaded into the flight management system 3 by an onboard electronic device comprising applications, of the EFB type. The auxiliary data input unit 20A checks the validity of the electronic signature of the load file and accepts the correction data contained in the load file only if the electronic signature is valid. The checking of the validity of the electronic signature makes it possible to ensure, on the one hand, that the correction data are actually coming from the computer 22 and, on the other hand, that these correction data have been verified as being in conformity with the set of authorizations and prohibitions by the checking unit 12B of the computer 22.

In comparison with the first alternative, in the second alternative, the checking unit 12B, and the memory 14B, are shifted from the flight management system 3 to the computer 22 outside of the flight management system. This makes it possible to reduce the complexity of the flight management system 3 in comparison with the first alternative.

The different embodiments described with reference to the first alternative shown in FIG. 1A are also able to be applied to the second alternative shown in FIG. 1B, insofar as they are technically compatible with that second alternative. Consequently, these embodiments will not be further described in the context of the second alternative.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for adjusting performance variables of an aircraft, the method comprising:
   a correction data input step, implemented by at least one auxiliary data input, comprising entering correction data into a computer and/or the flight management system, the correction data to be used for adjusting at least one associated performance variable;
   a checking step comprising checking, during the correction data input step, if the entered correction data are in conformity with a set of authorizations and prohibitions, the set of authorizations and prohibitions being predetermined and recorded in a memory, the checking step also comprising issuing a correction authorization or a correction rejection as a function of a result of the checking step; and
   a correction step, implemented by the flight management system, comprising carrying out a correction solely upon issuance of the correction authorization during the checking step, the correction comprising adjusting the associated performance variable based on the correction data.

2. The method according to claim 1, wherein the set of authorizations and prohibitions comprises at least one of:
   at least one list of performance variables, for which a correction is authorized;
   parameters as a function of which the correction data are defined;
   acceptable limit values for the values of the correction data; and
   at least one list of performance variables, for which a correction is not authorized.

3. The method according to claim 1, wherein the correction data comprises at least one of:
   a multiplier and/or a bias; and
   a mathematical function.

4. The method according to claim 3, wherein the correction step comprises:
   for an item of correction data corresponding to a multiplier and/or to a bias, applying the multiplier and/or the bias to the associated performance variable; and
   for an item of correction data corresponding to a mathematical function, applying the mathematical function to the associated performance variable.

5. The method according to claim 1, comprising an alert step comprising generating an indication of rejection of correction data, intended for at least one operator, when the correction rejection is issued in the checking step.

6. The method according to claim 1, wherein the auxiliary data input comprises a data transmission link.

7. The method according to claim 1, wherein the auxiliary data input comprises a data loading and configuration system of a DLCS (Data Loading Configuration System) type.

8. The method according to claim 1, wherein the auxiliary data input comprises an onboard electronic device comprising applications.

9. A device for adjusting performance variables of an aircraft, the device comprising:
   at least one auxiliary data input for entering correction data into a computer and/or the flight management system, the correction data being configured for use in adjusting at least one associated performance variable;
   a checking unit for checking, while the correction data is entered into computer and/or the flight management system, if the entered correction data are in conformity with a set of authorizations and prohibitions, the set of authorizations and prohibitions being predetermined and recorded in a memory, the checking unit also being configured to issue a correction authorization or a correction rejection as a function of whether the entered correction data are in conformity with the set of authorizations and prohibitions; and
   a correction unit configured for carrying out a correction comprising adjusting the associated performance variable based on the correction data solely upon issuance of the correction authorization by the checking unit.

10. The device according to claim 9, wherein the device is configured to generate an indication of rejection of correction data, intended for at least one operator, when the correction rejection is issued by the checking unit.

11. The device according to claim 9, wherein the auxiliary data input comprises a data transmission link.

12. The device according to claim 9, wherein the auxiliary data input comprises a data loading and configuration system of a DLCS (Data Loading Configuration System) type.

13. The device according to claim 9, wherein the auxiliary data input comprises an onboard electronic device comprising applications.

14. A flight management system of an aircraft, the flight management system comprising:
   at least one performance database;
   at least one data input;
   a performance computation unit configured to generate performance variables based on data from the at least one performance database and on data entered using the data input unit; and
   at least one device for adjusting performance variables according to claim 9.

15. The flight management system according to claim 14, wherein the memory is separate from the at least one performance database.

16. The flight management system according to claim 14, wherein the set of authorization and prohibitions comprises at least one of:
   at least one list of performance variables, for which a correction is authorized;
   parameters as a function of which the correction data are defined;
   acceptable limit values for the values of the correction data; and
   at least one list of performance variables, for which a correction is not authorized.

17. The flight management system according to claim 14, wherein the memory is a part of the at least one performance database.

18. The device according to claim 9, wherein the set of authorization and prohibitions comprises at least one of:
   at least one list of performance variables, for which a correction is authorized;
   parameters as a function of which the correction data are defined;
   acceptable limit values for the values of the correction data; and
   at least one list of performance variables, for which a correction is not authorized.

19. The device according to claim 9, wherein the correction data comprises at least one of:
   a multiplier and/or a bias; and
   a mathematical function.

20. The device according to claim 19, wherein:
   when an item of correction data corresponds to a multiplier and/or to a bias, the correction unit is configured to apply the multiplier and/or the bias to the associated performance variable; and when an item of correction data corresponds to a mathematical function, the correction unit is configured to apply the mathematical function to the associated performance variable.

* * * * *